United States Patent
Bayadi et al.

(10) Patent No.: US 12,098,708 B2
(45) Date of Patent: Sep. 24, 2024

(54) SYSTEMS AND METHODS FOR OPERATING A POWER GENERATING ASSET

(71) Applicant: General Electric Renovables Espana, S.L., Barcelona (ES)

(72) Inventors: Ramaprakash Bayadi, Bangalore (IN); Karthick Vilapakkam Gourishankar, Bangalore (IN); Karthikeyan Appuraj, Hyderabad (IN)

(73) Assignee: General Electric Renovables Espana, S.L., Barcelona (ES)

( * ) Notice: Subject to any disclaimer, the term of this patent is extended or adjusted under 35 U.S.C. 154(b) by 691 days.

(21) Appl. No.: 17/151,764

(22) Filed: Jan. 19, 2021

(65) Prior Publication Data
US 2022/0228558 A1 Jul. 21, 2022

(51) Int. Cl.
*H02J 7/00* (2006.01)
*F03D 7/04* (2006.01)
*F03D 17/00* (2016.01)
*H02J 7/14* (2006.01)

(52) U.S. Cl.
CPC ............. *F03D 7/045* (2013.01); *F03D 7/047* (2013.01); *F03D 17/00* (2016.05); *H02J 7/005* (2020.01); *H02J 7/007192* (2020.01); *H02J 2300/28* (2020.01)

(58) Field of Classification Search
CPC ............................ H02J 7/007192; H02J 7/005
See application file for complete search history.

(56) References Cited

U.S. PATENT DOCUMENTS

| | | | |
|---|---|---|---|
| 6,469,512 B2 | 10/2002 | Singh et al. |
| 7,615,967 B2 | 11/2009 | Cho et al. |
| 7,847,557 B2 | 12/2010 | Yun et al. |
| 8,560,257 B2 | 10/2013 | Tang et al. |
| 9,157,966 B2 | 10/2015 | Papana et al. |
| 10,211,487 B2 | 2/2019 | Kim et al. |

(Continued)

FOREIGN PATENT DOCUMENTS

| | | |
|---|---|---|
| WO | WO 2020/026502 A1 | 2/2020 |
| WO | WO 2020/149288 A1 | 7/2020 |

OTHER PUBLICATIONS

Liu et al., An Incremental Updating Method for Online Monitoring State-of-Health of VRLA Batteries, 2017 12$^{th}$ International Conference on Intelligent Systems and Knowledge Engineering (ISKE), Nanjing China, Nov. 24-26, 2017, 7 Pages. (Abstract Only).

(Continued)

*Primary Examiner* — Alexis B Pacheco
(74) *Attorney, Agent, or Firm* — Dority & Manning, P.A.

(57) ABSTRACT

Systems and methods are provided for controlling a power generating asset having an energy storage device. Accordingly, a controller of the power generating asset initiates a state-change event for the energy storage device. The controller determines an actual equivalent series resistance (ESR) function for the energy storage device based on a change in a first and a second electrical condition at each of a plurality of sampling intervals of the state-change event. The controller determines a state-of-health rating for the energy storage device based on the actual ESR function and implements a control action based on the state-of-health rating.

14 Claims, 7 Drawing Sheets

(56) References Cited

U.S. PATENT DOCUMENTS

| | | | | |
|---|---|---|---|---|
| 10,547,173 B2* | 1/2020 | Zhao | | H02J 1/10 |
| 2001/0043050 A1* | 11/2001 | Fisher, Jr. | | H02J 7/35 |
| | | | | 320/101 |
| 2013/0271148 A1* | 10/2013 | Maeda | | G01R 31/392 |
| | | | | 324/426 |
| 2014/0266228 A1 | 9/2014 | Baruzzi et al. | | |
| 2014/0306712 A1 | 10/2014 | Esnard-Domerego | | |
| 2015/0008671 A1* | 1/2015 | Palomares Rentero | | |
| | | | | F03D 9/255 |
| | | | | 290/44 |
| 2015/0293183 A1* | 10/2015 | Tenmyo | | G01R 31/392 |
| | | | | 324/429 |
| 2015/0323611 A1* | 11/2015 | Kise | | H02J 7/005 |
| | | | | 702/63 |
| 2015/0349387 A1* | 12/2015 | Inaba | | H02J 7/0048 |
| | | | | 700/297 |
| 2016/0352125 A1* | 12/2016 | Choi | | H02J 7/0063 |
| 2017/0170667 A1* | 6/2017 | Chang | | H02J 7/0063 |
| 2017/0170684 A1* | 6/2017 | Matthey | | G05B 13/026 |
| 2017/0353045 A1* | 12/2017 | Ravid | | H01M 10/0525 |
| 2019/0079139 A1* | 3/2019 | Melius | | H01M 10/486 |
| 2021/0098994 A1* | 4/2021 | White | | H02J 7/02 |
| 2021/0215137 A1* | 7/2021 | Damgaard | | F03D 7/044 |
| 2023/0016562 A1* | 1/2023 | Maarbjerg | | H02M 7/53871 |
| 2023/0020146 A1* | 1/2023 | Mizoguchi | | H01M 10/42 |

OTHER PUBLICATIONS

Samolyk et al., Development of an Algorithm for Estimating Lead-Acid Battery State of Charge and State of Health, Blekinge Institute of Technology, 2013, 81 Pages.

European Search Report for EP application No. 22150058.0, mail date of Jul. 12, 2022.

Moseley, Patrick T. et al., Electrochemical Energy Storage for Renewable Sources and Grid Balancing, Elsevier, NL, Nov. 7, 2014, pp. ToC, Ch. 13-14, Ch. 16.

* cited by examiner

SYSTEMS AND METHODS FOR OPERATING A POWER GENERATING ASSET

FIELD

The present disclosure relates in general to power generating assets, and more particularly to systems and methods for determining a state-of-health rating for an energy storage device of a power generating asset.

BACKGROUND

Power generating assets may take a variety of forms, including but not limited to assets which rely on renewable and/or nonrenewable sources of energy. Such power generating assets may generally be considered one of the cleanest, most environmentally friendly energy sources presently available. For example, wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple wind turbine generators that are operable to supply power to a transmission system providing power to a power grid.

Certain power generating assets may also include at least one energy storage device, such as a battery or capacitor, which may serve as a backup power supply to a component of the power generating asset. During normal operation, components of the wind turbine, such as pitch drive motors, may be driven by power supplied by the power grid. However, in some instances, such as during a transient grid event, these components may be driven by the energy storage devices. Thus, the utilization of an energy storage device may ensure that the power generating asset may be controlled even in the absence of grid power. For example, the utilization of an energy storage device coupled to the pitch drive system of the wind turbine may permit the pitching of the rotor blades toward feather in the event grid power is lost. This, in turn, may prevent an overspeed event from negatively impacting the wind turbine.

Accordingly, it may be desirable to ensure that the energy storage is capable of operating when needed. As such, it may be desirable to determine a state of health of the energy storage device on a regular basis.

Thus, the art is continuously seeking new and improved systems and methods that address the aforementioned issues. As such, the present disclosure is directed to systems and methods for determining a state-of-health rating for an energy storage device of a power generating asset so as to ensure the energy storage device remains operable.

BRIEF DESCRIPTION

Aspects and advantages of the invention will be set forth in part in the following description, or may be obvious from the description, or may be learned through practice of the invention.

In one aspect, the present disclosure is directed to a method for operating a power generating asset. The power generating asset may have an energy storage device operably coupled to a component of the power generating asset. The method may include initiating with a controller, which may be a controller of the power generating asset, a state-change event for an energy storage device. The state-change event may define a plurality of sampling intervals. The method may also include determining, via the controller, a change in a first and a second electrical condition of the energy storage device at each of the sampling intervals of the state-change event. Additionally, the method may include determining, via the controller, an actual equivalent series resistance (ESR) function for the energy storage device based on the change in the first and second electrical conditions at each of the sampling intervals of the state-change event. Further, the method may include determining, via the controller, a state-of-health rating for the energy storage device based on the actual ESR function of the energy storage device. The method may also include implementing a control action based on the state-of-health rating.

In an embodiment, determining the state-of-health rating for the energy storage device may include modeling, via the controller, a nominal ESR function for the energy storage device at an ambient temperature. The nominal ESR function may correspond to a maximal state-of-health rating at the ambient temperature. The method may include modeling, via the controller, at least one potential ESR function for the energy storage device at the ambient temperature. The potential ESR function(s) may indicate an increased ESR value relative to a nominal ESR value as a function of the second electrical condition. The potential ESR function(s) may correspond to a reduced state-of-health rating at the ambient temperature. Additionally, the method may include consolidating, via the controller, the nominal ESR function and the potential ESR function(s) into a look-up table, a graphical representation, and/or an algorithm so as to establish a correlation between the actual ESR function and the state-of-health rating for the energy storage device at the ambient temperature as a function of the second electrical condition of the energy storage device.

In an additional embodiment, the method may include defining, via the controller, a plurality of temperature intervals across a nominal operating range of temperatures for the energy storage device. A temperature interval of the plurality of temperature intervals may correspond to the ambient temperature. The method may also include determining, via the controller, the nominal ESR function and the potential ESR function(s) at each temperature interval of the plurality of temperature intervals. Additionally, the method may include establishing a correlation between the actual ESR function and the state-of-health rating for the energy storage device at each temperature interval as a function of the second electrical condition of the energy storage device.

In a further embodiment, determining the state-of-health rating for the energy storage device may also include determining the state-of-health rating corresponding to the determined actual ESR function at the ambient temperature of the energy storage device based on the correlation between the actual ESR function and the state-of-health rating.

In yet a further embodiment, the first electrical condition may be a voltage. Determining a change in the first electrical condition of the energy storage device may also include determining a difference between an open-circuit voltage of the energy storage device and an instantaneous voltage of the energy storage device at each of the sampling intervals of the state-change event.

In an embodiment, implementing the control action may include detecting an approach of the state-of-health rating to a state-of-health threshold and generating an alert to facilitate scheduling of a maintenance event.

In an additional embodiment, the state-change event may include a scheduled test event and/or a manipulation of the energy storage device during operation of the power generating asset.

In a further embodiment, the scheduled test event may be accomplished in conjunction with at least one additional component test of the power generating asset and results in an updating of the state-of-health rating.

In yet a further embodiment, the state-change event may include a discharging event of the energy storage device or a charging event of the energy storage device.

In an embodiment, determining the actual ESR function may include determining the actual ESR function as a function of the second electrical condition and independent of a first electrical condition discharge profile and a second electrical condition discharge profile.

In an additional embodiment, the method may include receiving, via the controller, a cycle count and/or a time count elapsed from an installation date. The method may also include determining, via the controller, a correlation between the state-of-health rating and the received cycle count and/or time count. The correlation may be indicative of a rate of degradation of the energy storage device per cycle count and/or, time count. Additionally, the method may include determining a state-of-health threshold for the energy storage device. Based on the correlation of the state-of-health threshold, the method may also include determining, via the controller, a number of cycles and/or time until the state-of-health threshold is reached.

In another aspect, the present disclosure is directed to a method for operating an energy storage device. The method may include initiating, with the controller, a discharge event for the energy storage device. The discharge event may define a plurality of sampling intervals. The method may also include determining, via the controller, a change in a voltage and a current of the energy storage device at each of the plurality of sampling intervals of the discharge event. Additionally, the method may include determining, via the controller, an actual equivalent series resistance (ESR) function for the energy storage device based on the change in the voltage and the current at each of the plurality of sampling intervals of the discharge event. Further, the method may include determining, via the controller, a state-of-health rating for the energy storage device based on the actual ESR function of the energy storage device. Additionally, the method may include implementing a control action based on the state-of-health rating.

In another aspect, the present disclosure is directed to a system for operating a power generating asset. The system may include an energy storage device operably coupled to a component of the power generating asset. The system may also include a controller communicatively coupled to the energy storage device. The controller may include at least one processor configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
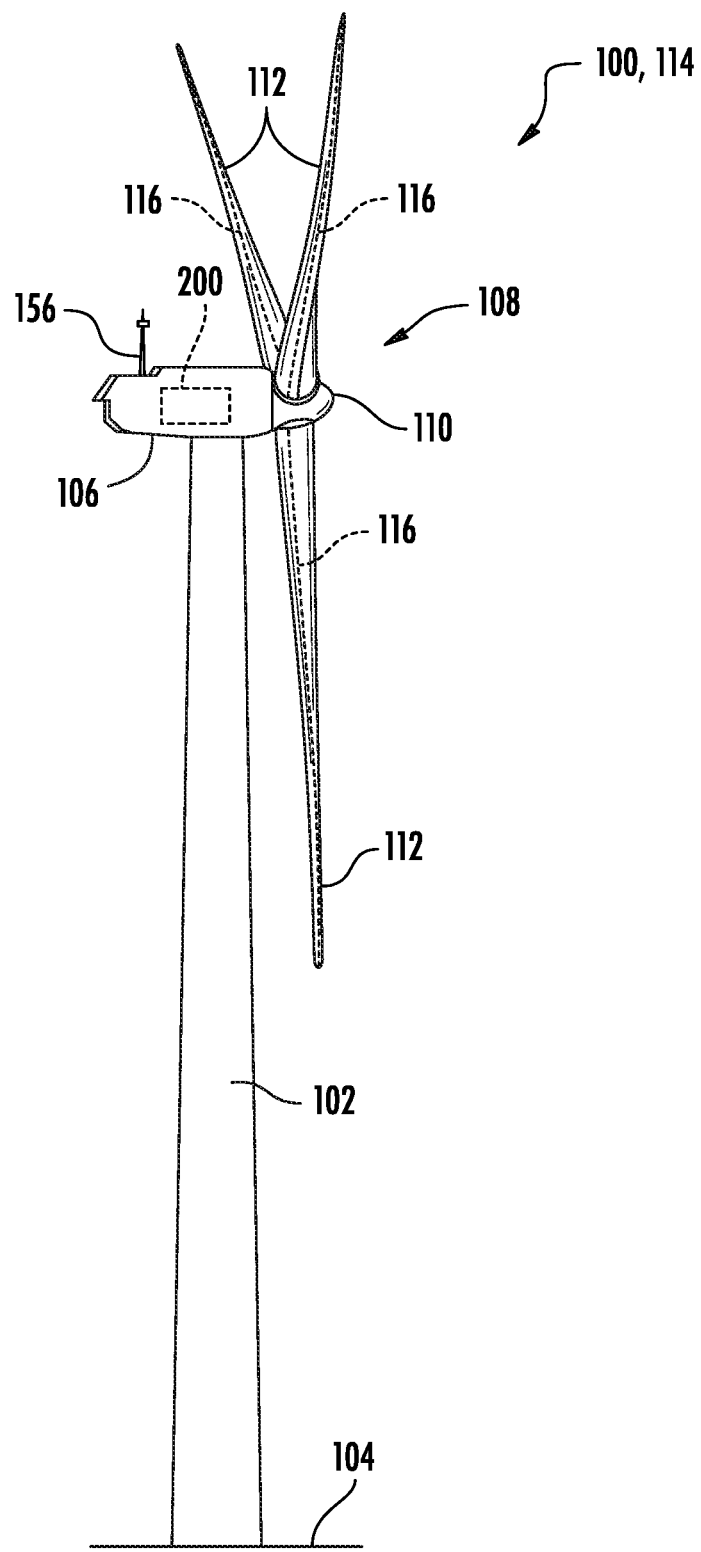
FIG. 1 illustrates a perspective view of one embodiment of a power generating asset configured as a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for operating a power generating asset. The power generating asset, such as a wind turbine, may have an energy storage device operably coupled to at least one component. The energy storage device may, for example, be a battery, a capacitor, or other suitable energy storage device which permits the continued, or emergency, operation of the component should grid power be disrupted. By way of illustration, when configured as a wind turbine, the pitch system of the wind turbine may be equipped with an energy storage device in order to ensure that the pitch system remains operable in the event of a power failure. This, in turn, may permit the pitching of the rotor blades to feather in order to slow the wind turbine as necessary even if the power from the power grid is interrupted. It should be appreciated that the ability to control a component of the power generating asset regardless of whether grid power is being received may facilitate the transition of the power generating asset to a safe operating mode and, thereby serve to prevent/mitigate potential damage to the power generating asset. Therefore, it may be desirable to determine a state of health of the energy storage device in order to ensure the energy storage device may be fully operational when called upon.

In order to determine the state of health of the energy storage device, the present disclosure requires the initiation of a state-change event, such as a charge or a discharge event, for the energy storage device. During the state-change event, the change in a first electrical condition and a second electrical condition of the energy storage device, such as a change in voltage and/or current, may be determined. From the change in conditions, an actual equivalent series resistance (ESR) function for the energy storage device may be determined. The ESR may represent the internal resistance of the energy storage device as seen during a charging or discharging event. The magnitude of ESR may vary depending on the particular characteristics (e.g. materials used, construction quality, degree of degradation, cell chemistry, ambient temperature) of the energy storage device. Accordingly, the ESR may be compared to a nominal ESR and/or projected ESR. This comparison may, for example, include plotting the actual ESR function and the nominal ESR function relative to the second electrical condition (e.g. current). A comparison of the ESR values at a specified value of the second electrical condition may indicate a decline in the state of health of the power generating asset.

For example, at a specific current level, the nominal ESR function may indicate a first ESR value, while at the same current level, the actual ESR function may indicate a second ESR value. A second ESR value which is greater than the first ESR value may be indicative of a decline in the state of health of the energy storage device. In other words, for a given current and temperature, the ESR of the energy storage device may increase as the remaining lifespan of the energy storage device decreases. It should be appreciated that detecting this degradation in the energy storage device may facilitate the generation of an alarm and/or a maintenance schedule.

Referring now to the drawings, FIG. 1 illustrates a perspective view of one embodiment of a power generating asset 100 according to the present disclosure. As shown, the power generating asset 100 may be configured as a wind turbine 114. In an additional embodiment, the power generating asset 100 may, for example, be configured as a solar power generating asset, a hydroelectric plant, a fossil fuel generator, and/or a hybrid power generating asset. As shown, the wind turbine 114 may generally include a tower 102 extending from a support surface 104, a nacelle 106, mounted on the tower 102, and a rotor 108 coupled to the nacelle 106. The rotor 108 may include a rotatable hub 110 and at least one rotor blade 112 coupled to, and extending outwardly from, the hub 110. For example, in the illustrated embodiment, the rotor 108 includes three rotor blades 112. However, in an additional embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The power generating asset 100 may also include a controller 200. When configured as a wind turbine 114, the controller 200 may be configured as a turbine controller centralized within the nacelle 106. However, in other embodiments, the controller 200 may be located within any other component of the wind turbine 114 or at a location outside the wind turbine 114. Further, the controller 200 may be communicatively coupled to any number of the components of the power generating asset 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
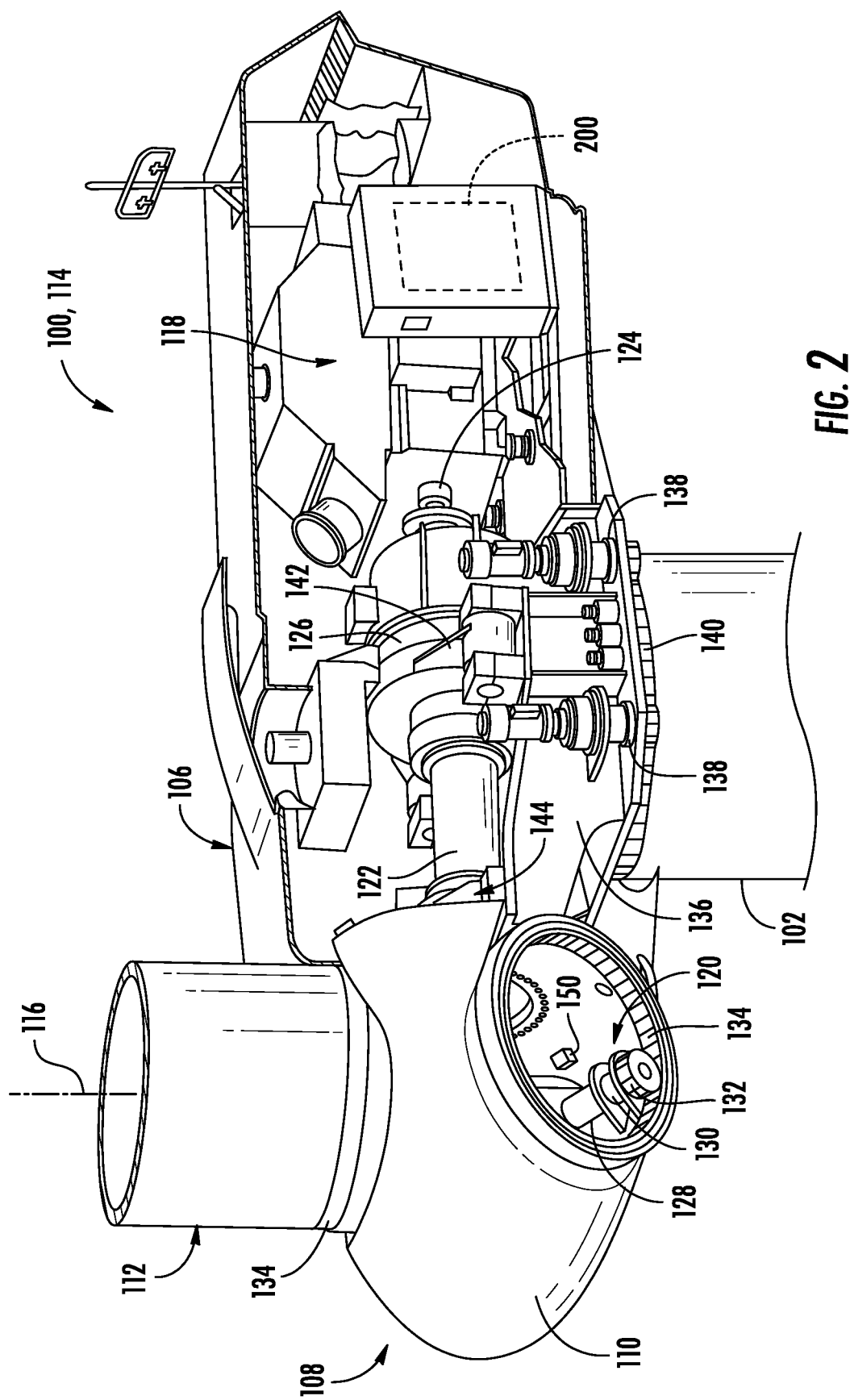
FIG. 2 illustrates a perspective, internal view of one embodiment of a nacelle of the wind turbine according to the present disclosure.

Referring now to FIG. 2, a simplified, internal view of one embodiment of the nacelle 106 of the wind turbine 114 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118.

Each rotor blade 112 may also include a pitch control mechanism 120 configured to rotate each rotor blade 112 about its pitch axis 116. Each pitch control mechanism 120 may include a pitch drive motor 128, a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116.

It should be appreciated that pitching the rotor blade(s) 112 about the pitch axis 116 may alter an angle of attack between the rotor blade(s) 112 and an apparent wind. Accordingly, the rotor blade(s) 112 may pitch to feather when the rotor blade(s) 112 rotates about the pitch axis 116 towards alignment with the apparent wind and to power when the rotor blade(s) rotates towards an orientation generally perpendicular to the apparent wind. It should be further appreciated that pitching to feather generally depowers the rotor blade(s) 112 as a result of a reduction in the resultant lift.

Similarly, the wind turbine 114 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 114). It should be appreciated that the controller 200 may direct the yawing of the nacelle 106 and/or the pitching of the rotor blades 112 so as to aerodynamically orient the wind turbine 114 relative to a wind acting on the wind turbine 114, thereby facilitating power production.

In an embodiment, the power generating asset 100 may also include an environmental sensor 156 configured for gathering data indicative of one or more environmental conditions. The environmental sensor 156 may be operably coupled to the controller 200. Thus, in an embodiment, the environmental sensor(s) 156 may, for example, be a wind vane, an anemometer, a lidar sensor, thermometer, barometer, or any other suitable sensor. The data gathered by the environmental sensor(s) 156 may include measures of wind speed, wind direction, wind shear, wind gust, wind veer, atmospheric pressure, and/or ambient temperature. In at least one embodiment, the environmental sensor(s) 156 may be mounted to the power generating asset 100 (e.g., to the nacelle 106 at a location downwind of the rotor 108). For example, the environmental sensor(s) 156 may, in alternative embodiments, be coupled to, or integrated with, the rotor 108 and/or positioned within the nacelle 106. It should be appreciated that the environmental sensor(s) 156 may include a network of sensors and may be positioned away from the power generating asset 100.

It should also be appreciated that, as used herein, the term "monitor" and variations thereof indicates that the various sensors of the power generating asset 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the power generating asset 100 and/or a component thereof.

Figure 3:
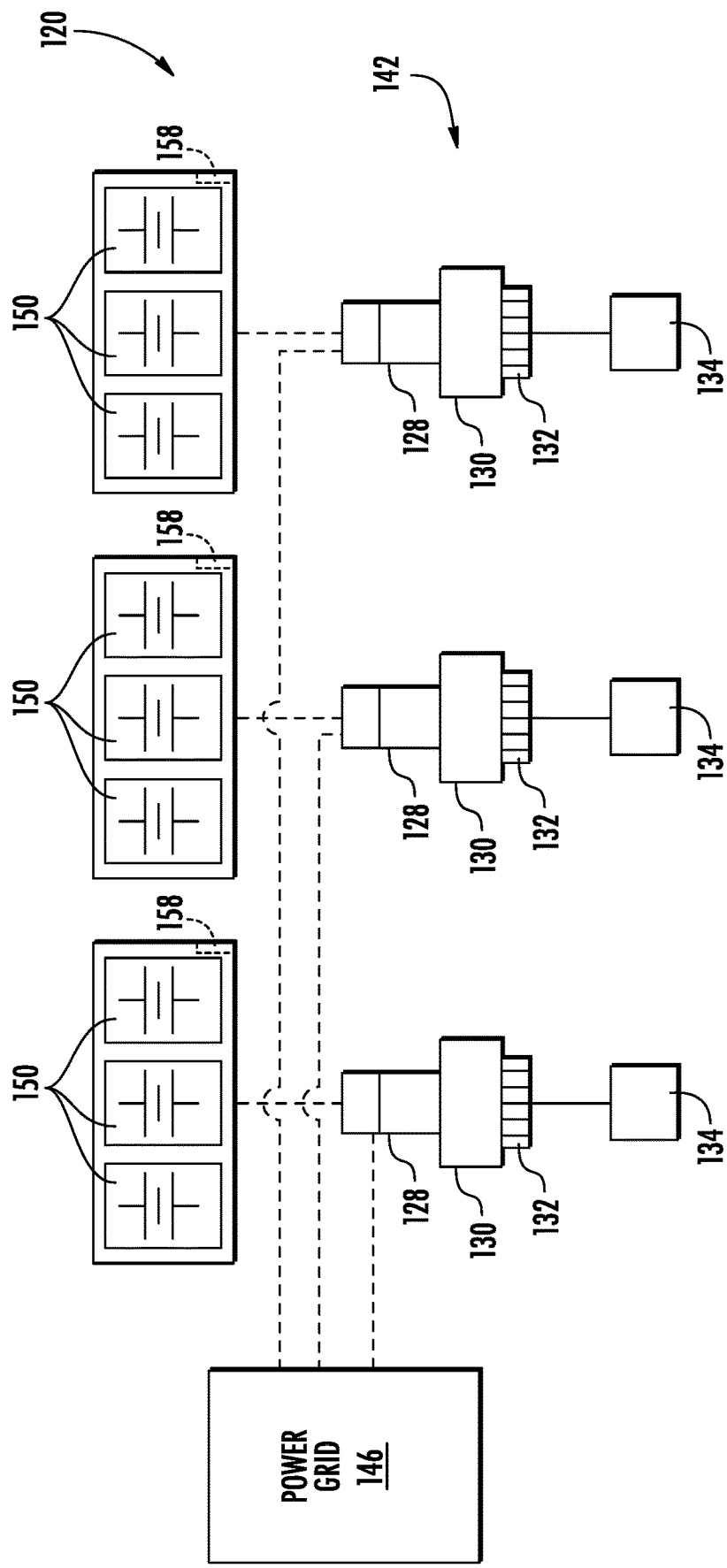
FIG. 3 illustrates a schematic diagram of one embodiment of an energy storage device operably coupled to a component of the power generating asset according to the present disclosure.
Figure 4:
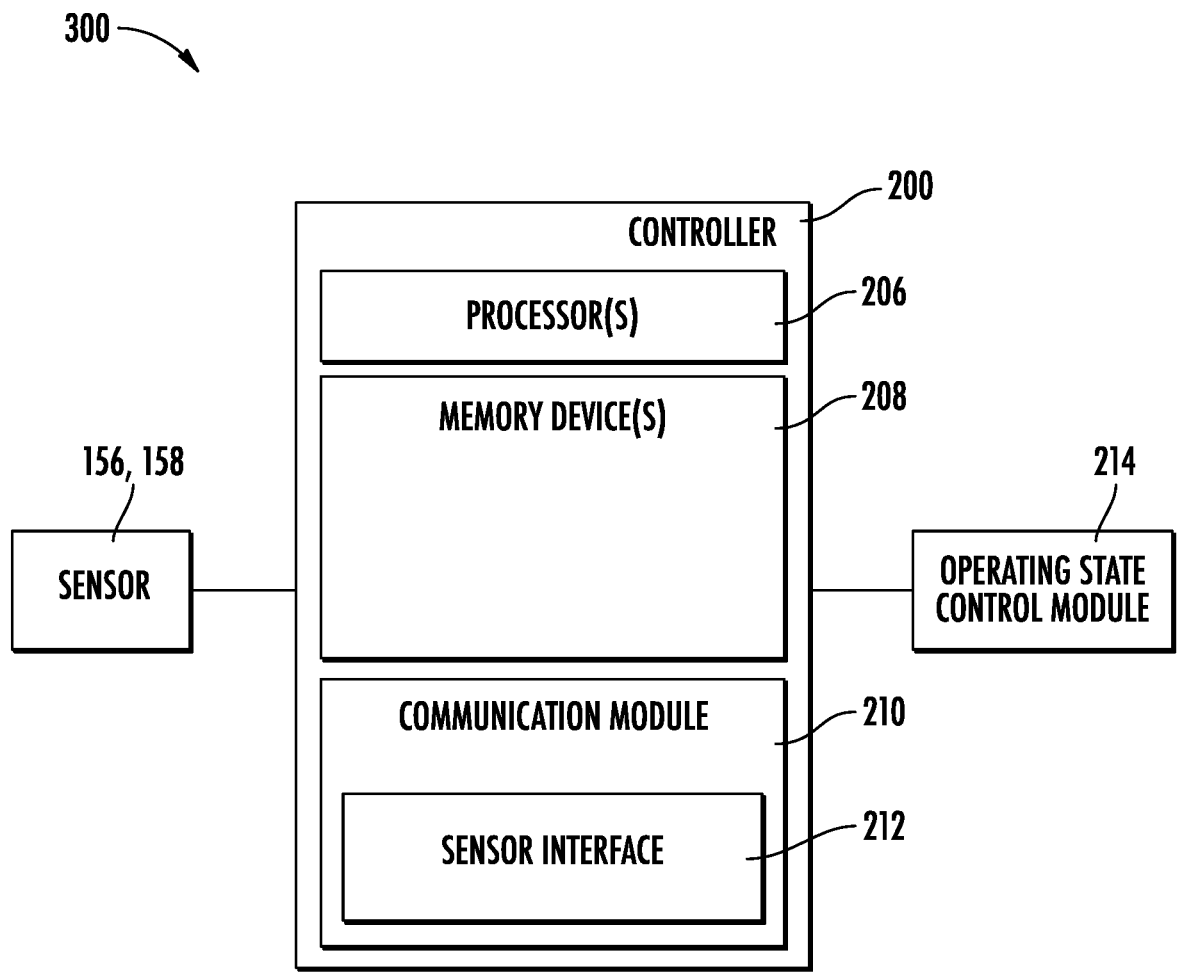
FIG. 4 illustrates a block diagram of one embodiment of a controller for use with the power generating asset according to the present disclosure.

Referring now to FIG. 3, a schematic diagram of one embodiment of an energy storage device 150 operably coupled to a component 142 of the power generating asset 100 is illustrated. In an embodiment such as depicted in FIG. 3, the component 142 may be configured as the pitch control mechanism 120 of the wind turbine 114. In an embodiment, the component 142 may be communicatively coupled to the power grid 146. Additionally, the component 142 may be communicatively coupled to at least one energy storage device 150. In various embodiments, the energy storage device(s) 150 may be a single battery, capacitor, and/or other suitable energy storage device or pluralities thereof.

In an embodiment, at least one condition sensor 158 may be communicatively coupled to the energy storage device(s) 150. The condition sensor(s) 158 may be configured to monitor at least a first electrical condition and a second electrical condition 302, 304 (FIG. 5) of the energy storage device(s) 150. For example, in monitoring the electrical conditions 302, 304, the condition sensor(s) 158 may monitor an open-circuit voltage, an instantaneous voltage, and/or a current of the energy storage device(s) 150. Accordingly, the condition sensor(s) 158 may, in an embodiment, be an ammeter, a voltmeter, an ohmmeter, and/or any other suitable sensor for monitoring the electrical conditions 302, 304 of the energy storage device(s) 150.

During normal operation of the power generating asset 100, the component 142 may be driven by the power grid 146. However, in some instances, such as during an adverse grid event or grid loss, the component 142 may be powered by the energy storage device(s) 150. Therefore, in an embodiment, the energy storage device(s) 150 may be configured as an uninterrupted power supply. Accordingly, the energy storage device(s) 150 may, in an embodiment, be utilized in a top-of-charge application. For example, when configured as pitch control mechanism 120, the pitch drive motor 128 may utilize power from the energy storage device(s) 150 in order to pitch the rotor blade(s) 112 toward feather in response to an adverse grid event. In an additional example, the component 142 may be the controller 200 and the energy storage device(s) 150 may provide an uninterrupted power source to the controller 200 in response to a loss of grid power. In yet a further example, the energy storage device(s) 150 may be operably coupled to the generator 118 and configured to receive at least a portion of the power output of the generator 118 and, in certain instances, deliver the received portion of the power to the power grid 146. It should be appreciated that if control of the component 142 relies on the energy storage device(s) 150 (i.e., due to a loss of grid power), it may be desirable to ensure that the energy storage device(s) 150 are capable of operating when called upon. Thus, the controller 200 may, in an embodiment, be configured to determine the state of health of the energy storage device(s) 150 on a regular basis.

Referring now to FIGS. 4-7, multiple embodiments of a system 300 for operating the power generating asset 100, e.g. the wind turbine 114, according to the present disclosure are presented. As shown particularly in FIG. 4, a schematic diagram of one embodiment of suitable components that may be included within the system 300 is illustrated. For example, as shown, the system 300 may include the controller 200 communicatively coupled to the environmental sensor(s) 156 and/or the condition sensor(s) 158. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the power generating asset 100. Further, the communications module 210 may include a sensor interface 212 (e.g., one or more analog-to-digital converters) to permit signals transmitted from the sensor(s) 156, 158 to be converted into signals that can be understood and processed by the processors 206. It should be appreciated that the sensor(s) 156, 158 may be communicatively coupled to the communications module 210 using any suitable means. For example, the sensor(s) 156, 158 may be coupled to the sensor interface 212 via a wired connection. However, in other embodiments, the sensor(s) 156, 158 may be coupled to the sensor interface 212 via a wireless connection, such as by using any suitable wireless communications protocol known in the art. Additionally, the communications module 210 may also be operably coupled to an operating state control module 214 configured to implement a control action based on a determination of the state of health of the energy storage device(s) 150.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, operating a power generating asset 100 as described herein, as well as various other suitable computer-implemented functions.

Figure 5:
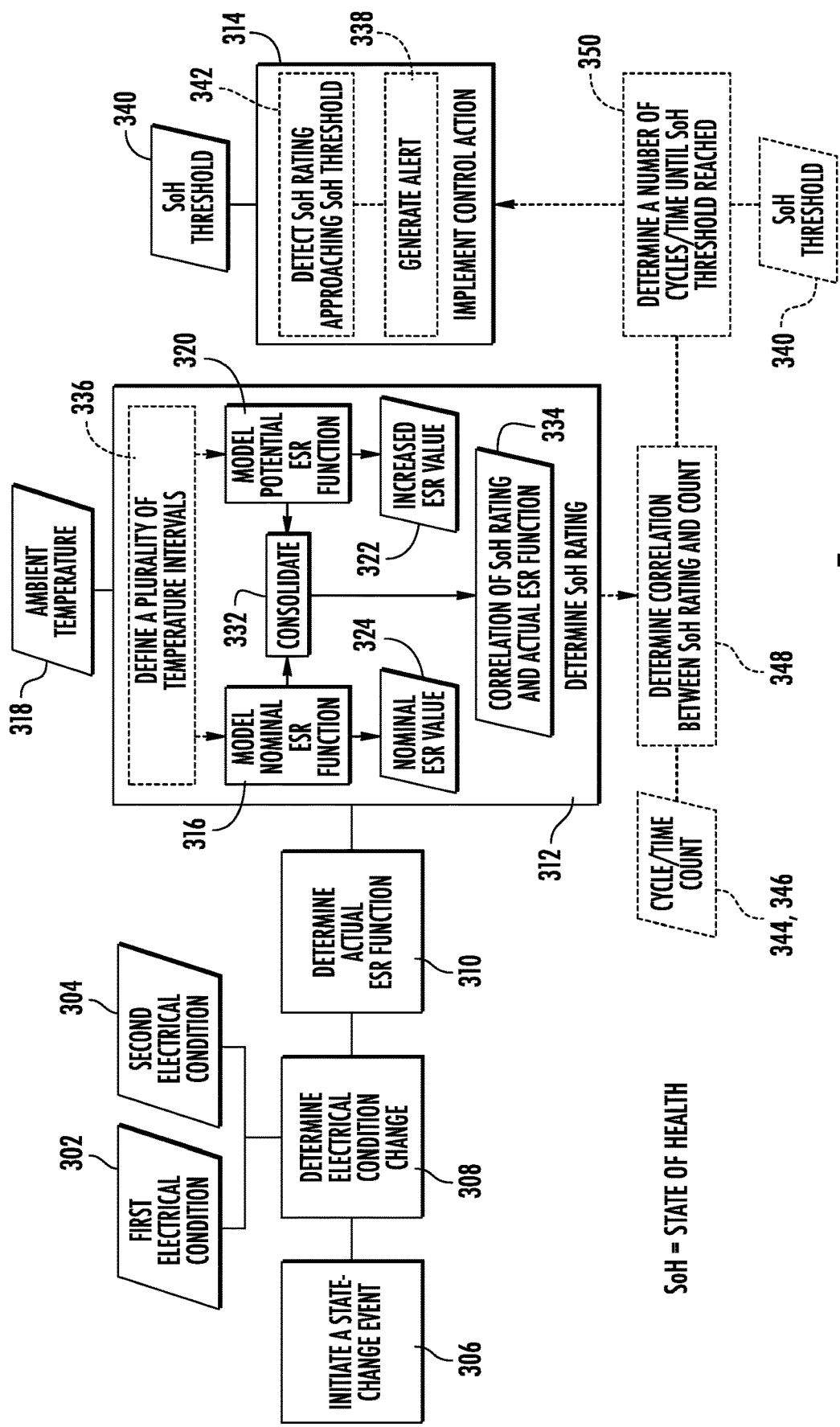
FIG. 5 illustrates a flow diagram of one embodiment of a control logic of a system for operating a power generating asset according to the present disclosure.

Referring particularly to FIG. 5, the controller 200 of the system 300 may be configured to initiate a state-change event 306 for the energy storage device(s) 150. The state-change event 306 may define a plurality of sampling intervals. In an embodiment, the plurality of sampling intervals may be time intervals, the sum of which may correspond to a duration of the state-change event 306. As depicted at 308, the controller 200 may, in an embodiment, determine a change in the first and second electrical conditions 302, 304 at each of the plurality of sampling intervals of the state-change event 306. From the change in the first and second electrical conditions 302, 304, the controller 200 may determine an actual equivalent series resistance (ESR) value ($ESR_t$) at each of the plurality of sampling intervals of the state-change event 306. The controller 200 may then utilize the ESR value ($ESR_t$) to determine an actual ESR function 310 for the energy storage device(s) 150. In an embodiment, the controller 200 may determine a state-of-health rating 312 for the energy storage device(s) 150 based on the actual ESR function 310 of the energy storage device(s) 150. Based on the state-of-health rating 312, in an embodiment, a control action 314 may be implemented.

In an embodiment, the state-change event 306 may be a discharge event. In an additional embodiment, the state-change event 306 may be a charging event. Accordingly, the state-change event 306 may, for example, be associated with a scheduled test event of the energy storage device(s) 150 and/or the component 142. Additionally, the state-change event 306 may, in an embodiment, be associated with a manipulation (e.g. usage) of the energy storage device(s) during an operation of the power generating asset 100. In other words, in an embodiment, the scheduled test event may be accomplished in conjunction with at least one additional component test of the power generating asset 100 and may result in an updating of the state-of-health rating 312.

In order to determine the state-of-health rating 312 for the energy storage device(s) 150, the controller 200 may, as depicted at 308, determine the change in the first and second electrical conditions 302, 304 which may occur during the state-change event 306. In an embodiment, the change may be detected, received, and/or computed at each of the sampling intervals defined by the state-change event 306. Accordingly, the change in the first and second electrical conditions 302, 304 may reflect a difference between an initial state of the first and second electrical conditions 302, 304 and a state of the electrical conditions at each of the sampling intervals.

Figure 6:
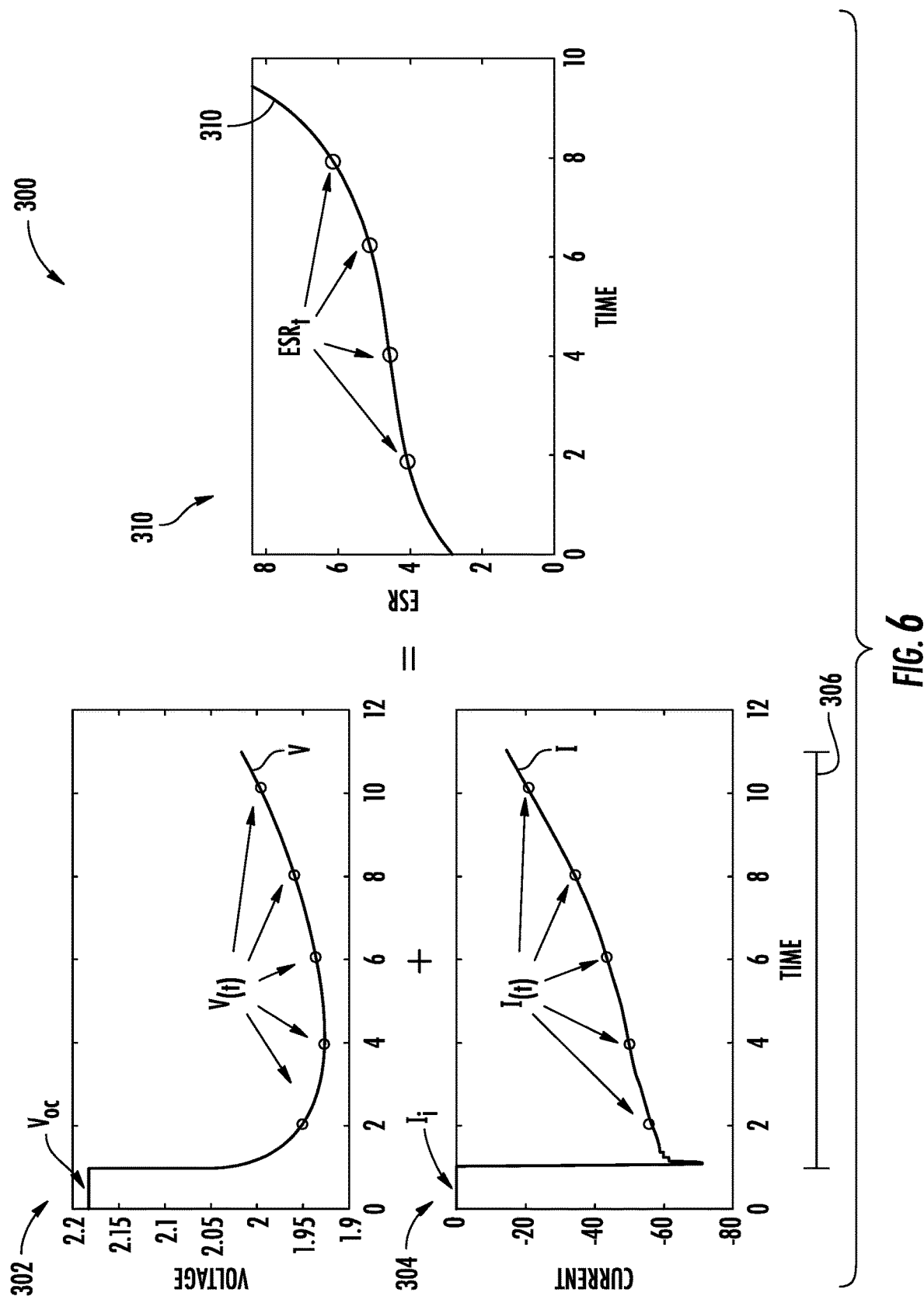
FIG. 6 illustrates a graphical representation of a relationship between changes in a first and a second electrical condition and an equivalent series resistance for an energy storage device of the power generating asset according to the present disclosure.

As depicted in FIG. 6, in an embodiment, the first electrical condition 302 may, for example, be a voltage (V). In such an embodiment, determining a change in the first electrical condition 302 of the energy storage device(s) 150 may include determining a difference between an open-circuit voltage ($V_{OC}$) of the energy storage device(s) 150 and an instantaneous voltage ($V_t$) of the energy storage device(s) 150 at each of the plurality of sampling intervals of the state-change event 306. The open-circuit voltage ($V_{OC}$) may represent a no-load voltage, or a rest potential, of the energy storage device(s) 150. The open circuit voltage ($V_{OC}$) may depend on a state of charge of the energy storage device(s) 150. In an embodiment wherein the energy storage device(s) 150 is configured as a backup energy source, such as an uninterrupted power supply, the open-circuit voltage ($V_{OC}$) may be considered to be a top-of-charge voltage. As such, the open-circuit voltage ($V_{OC}$) may be a known/nominal value. In an additional embodiment, the open-circuit voltage ($V_{OC}$) may be measured prior to the initiation of the state-change event 306.

In an additional embodiment, the second electrical condition 304 may, for example, be a current (I). Accordingly, determining a change in the second electrical condition 304 of the energy storage device(s) 150 may include determining a difference between the initial current ($I_i$) of the energy storage device(s) 150 immediately preceding the state-change event 306 and the instantaneous current ($I_t$) of the energy storage device(s) 150 at each of the plurality of sampling intervals of the state-change event 306. In an embodiment wherein the energy storage device(s) 150 is neither charging nor discharging prior to the initiation of the state-change event 306, the initial current ($I_i$) of the energy storage device(s) 150 preceding the state-change event 306 may be zero. As such, the change in the current (I) may equal the instantaneous current ($I_t$) measured by the condition sensor(s) 158 at each of the plurality of sampling intervals during the state-change event 306. In an additional embodiment, wherein the energy storage device(s) 150 is in a charging or discharging state immediately prior to the state-change event 306, the initial current ($I_i$) may be measured by the condition sensor(s) 158 at the instant of initiation of the state-change event 306.

It should be appreciated that, in an embodiment, it may be desirable to pre-filter the first and second electrical conditions 302, 304 in order to ensure the fidelity of the resultant state-of-health rating 312 for the energy storage device(s) 150. For example, in an embodiment, the controller 200 may be configured to monitor the current (I) prior to the initiation of the state-change event 306. The current (I) may, in an embodiment, indicate a recharging operation for the energy storage device(s) 150. As such, a current (I) above a specified threshold may indicate a degree of charging that may yield uncertainty regarding the open-circuit voltage ($V_{OC}$). In such an embodiment, the controller 200 may be configured to refrain from determining the state-of-health rating 312 for the state-change event 306 because uncertainty regarding the open-circuit voltage ($V_{OC}$) exists. Similarly, in an alternative embodiment, a current (I) below the specified threshold may indicate that the recharging operation is complete and that the open-circuit voltage ($V_{OC}$) may be considered to be a top-of-charge voltage.

As particularly depicted in FIGS. 5 and 6, in an embodiment, the controller 200 may utilize the changes in the first and second electrical conditions 302, 304 to determine the corresponding ESR value ($ESR_t$) at each of the plurality of sampling intervals of the state-change event 306. The controller 200 may then utilize the ESR values ($ESR_t$) to determine an actual ESR function 310. Accordingly, such an embodiment may normalize the actual ESR function 310 so that the actual ESR function 310 is invariant to a discharge history and discharge profiles, thereby establishing a tractable metric. For example, in an embodiment, the actual ESR function 310 may be a function of the second electrical condition 304 (e.g., current). Further, in an embodiment, the actual ESR function 310 may be independent of a first electrical condition 302 discharge profile and a second electrical condition 304 discharge profile.

In an embodiment wherein the first electrical condition 302 is the voltage (V) and the second electrical condition 304 is the current (I), the ESR of the energy storage device(s) 150 may be a function of the instantaneous current ($I_t$). As such, the ESR values ($ESR_t$) may be determined using the following equation:

$$ESR_t = \frac{V_{OC} - V_t}{I_i - I_t} \quad \text{(Equation 1)}$$

In an embodiment, a degradation of the energy storage device(s) 150 may be manifest in an increasing ESR for a given second electrical condition (e.g. current). As such, the controller 200 may determine a state-of-health rating 312 based on the actual ESR function 310. In order to facilitate the determination of the state-of-health rating 312, in an embodiment, the controller 200 may model a nominal ESR function 316 at an ambient temperature 318. The nominal ESR function 316 may represent the degree of internal resistance for a non-degraded energy storage device(s) 150. Therefore, the nominal ESR function 316 may correlate to a state-of-health rating 312 of a maximal value (e.g., 1, 100%, etc.) which may decrease with the degradation of the energy storage device(s) 150. It should, however, be appreciated that in an additional embodiment, the state-of-health rating 312 may be indicative of a degree of degradation and may therefore be a minimal value (e.g., 0, 0%, etc.) which may increase in proportion to an increasing degradation of the energy storage device(s) 150. It should be appreciated that when the actual ESR function 310 corresponds to the nominal ESR function 316, the state-of-health rating 312 may be considered to be a non-degraded state-of-health rating.

Figure 7:
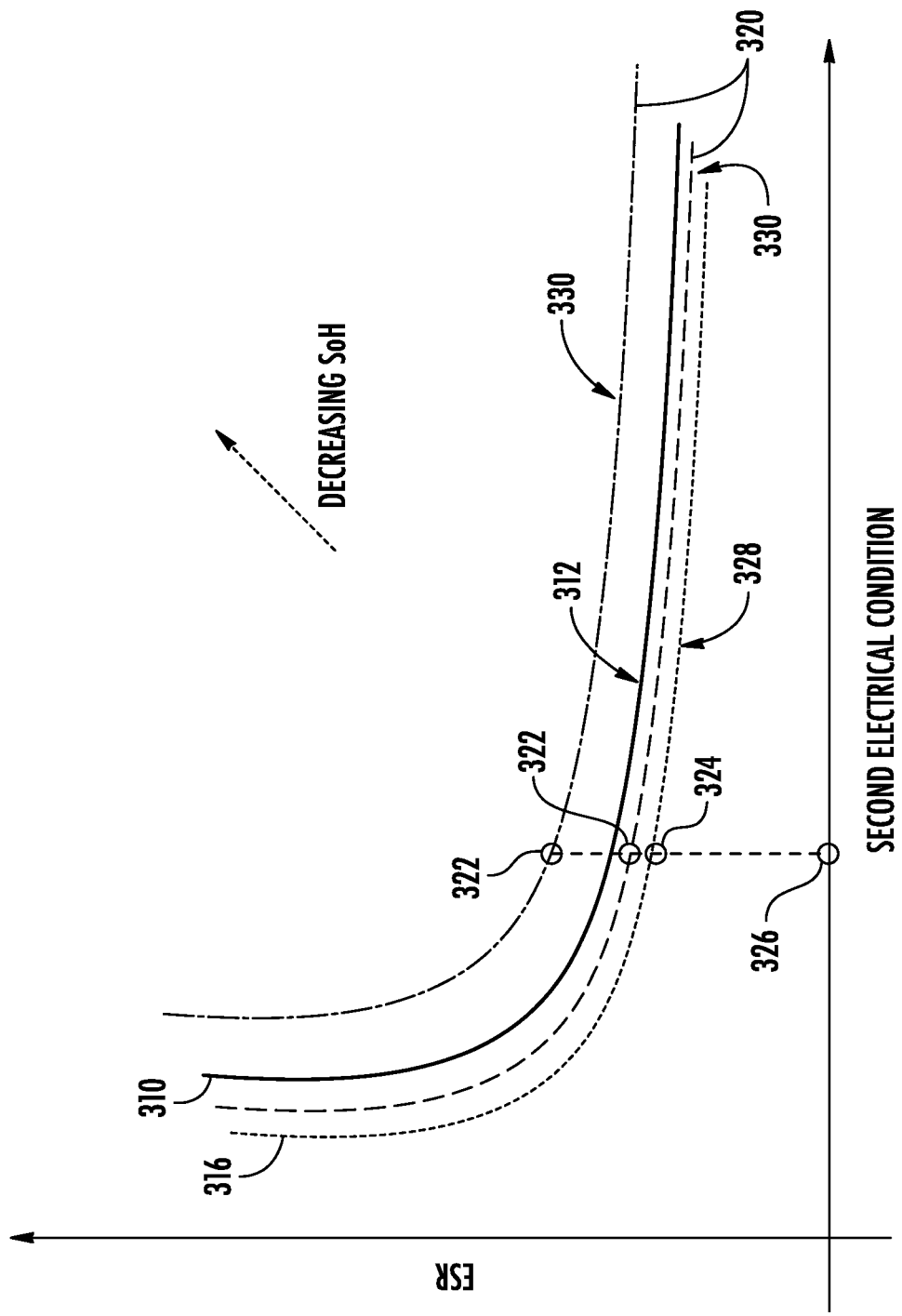
FIG. 7 illustrates a graphical representation of nominal, actual, and potential equivalent series resistance functions relative to a second electrical condition according to the present disclosure.

In addition to modeling the nominal ESR function 316, the controller 200 may, in an embodiment, also model at least one potential ESR function 320 at the ambient temperature 318. The potential ESR function(s) 320 may, as depicted in FIG. 7, indicate an increased ESR value 322 relative to a nominal ESR value 324 as a function of the second electrical condition 304. For example, the potential ESR function(s) 320 may indicate that for a given current 326, the energy storage device(s) 150 may present a greater degree of resistance (e.g., points 322) than at the nominal ESR value 324. This increase in the ESR value 322 may be indicative of a degradation of the energy storage device(s) 150. Therefore, the potential ESR function(s) 320 may correspond to a degraded/reduced state-of-health rating 330 at the same ambient temperature 318. In an embodiment wherein the non-degraded state-of-health rating 328 represents a maximal value, the degraded state-of-health rating 330 may represent a percentage of the maximum value (e.g., 0.9, 0.8, 0.7, etc.). Similarly, in an embodiment wherein the non-degraded state-of-health rating 328 represents a minimal value, the degraded state-of-health rating 330 may represent a degree of degradation (e.g., 0.1, 0.2, 0.3, etc.).

As depicted at 332 of FIG. 5, in an embodiment, the controller 200 may consolidate the nominal ESR function 316 and the potential ESR function(s) 320 into a look-up table, a graphical representation, and/or an algorithm. This consolidation may establish a correlation 334 between the actual ESR function 310 and the state-of-health rating 312 for the energy storage device(s) 150 at the ambient temperature 318 as a function of the second electrical condition 304 of the energy storage device(s) 150. Accordingly, determining the state-of-health rating 312 for the energy storage device(s) 150 may include the utilization of the look-up table, graphic orientation, and/or algorithm to determine the state-of-health rating 312 corresponding to the actual ESR function 310, which may be based off of the changes in the electrical conditions during the state-change event 306.

It should be appreciated that the level of internal resistance of the energy storage device(s) 150 may, for example, vary with the ambient temperature 318 regardless of any degradation of the energy storage device(s) 150. As such, in an embodiment, the controller 200 may define a plurality of temperature intervals 336 across a nominal operating range of temperatures for the energy storage device(s) 150. In an embodiment, at least one of the plurality of temperature intervals 336 may correspond to or overlap the ambient temperature 318 at the initiation of the state-change event 306. The plurality of temperature intervals 336 may, in an embodiment, correspond to a plurality of less than or equal to ten-degree temperature intervals 336.

Insofar as the nominal ESR function 316 and potential ESR function(s) 320 may vary at different ambient temperatures at which the energy storage device(s) 150 may operate, in an embodiment, the controller 200 may determine the nominal ESR function 316 and the potential ESR function(s) 320 at each of the plurality of temperature intervals 336. In an embodiment, the nominal ESR functions 316 and the potential ESR function(s)s 320 at each of the plurality of temperature intervals 336 may be assembled into a multi-dimensional, look-up table, a multi-dimensional graphical representation, and/or an algorithm. Such an assemblage may facilitate the establishment of a correlation between the actual ESR function 310 and the state-of-health rating 312 as a function of the second electrical condition 304 of the energy storage device(s) 150 at each temperature interval of the plurality of temperature intervals 336. In other words, given an ambient temperature 318 within the nominal operating range of temperatures for the energy storage device(s) 150 and an actual ESR function 310 based on the determined electrical condition change for the state-change event 306, the correlations (such as those assembled into the multi-dimensional, look-up table, a multi-dimensional graphical representation, and/or an algorithm) may be utilized to determine the state-of-health rating 312 for the energy storage device(s) 150.

Additionally, in an embodiment, the controller 200 may correlate the state-of-health rating 312 determined for the ambient temperature to a state-of-health rating 312 at a second temperature via a correlation function. For example, in an embodiment wherein the second temperature is lower than the ambient temperature, the state-of-health rating 312 at the second temperature may indicate a decreased capability of the energy storage device(s) 150 than is indicated for the energy storage device(s) 150 operating at the ambient temperature. It should be appreciated that the relationship between the state of health rating and the ambient/forecasted temperatures may be employed to predict the ability of the energy storage device(s) 150 to provide the necessary power when required during a forecasted period (e.g. winter or summer).

In an embodiment, the system 300 may implement the control action 314 based on the state-of-health rating 312. For example, in an embodiment, the control action 314 may include generating an alert 338. The generation of the alert 338 may facilitate the scheduling of a maintenance event. Accordingly, the alert 338 may include an auditory signal, a visual signal, a notification, a system input, and/or any other system which may identify the state-of-health rating 312 to an operator. It should be appreciated that the control action 314, as described herein, may further include any suitable command or constraint by the controller 200. For example, in an embodiment, the control action 314 may include temporarily de-rating the power generating asset 100. Additionally, in an embodiment, the control action 314 may include limiting an operation of at least one component of the power generating asset. For example, the control action 314 may limit a pitching of a rotor blade 112 and/or a yawing of the nacelle 106 of the wind turbine 114 when the state-of-health rating 312 indicates that the energy storage device(s) 150 may not have sufficient health to respond in the expected manner when called upon.

As depicted in FIG. 5, in implementing the control action 314, the controller 200 may, in an embodiment, receive a state-of-health threshold 340. The state-of-health threshold 340 may be indicative of a degree of degradation of the component 142 at which a control action may be desirable. In such an embodiment, the controller 200 may, at 342, detect an approach of the state-of-health rating 312 to the state-of-health threshold 340. In response to detecting the approach of the state-of-health rating 312 to the state-of-health threshold 340, the controller 200 may implement the control action 314 by generating the alert 338 to facilitate scheduling of the maintenance event.

Referring still to FIG. 5, in an embodiment, the controller 200 of the system 300 may receive a cycle count 344 and/or a time count 346 elapsed from an installation date of the energy storage device(s) 150. The controller 200 may then determine a correlation 348 between the state-of-health rating 312 and the cycle count 344 and/or time count 346. The correlation 348 may be indicative of a rate of degradation of the energy storage device(s) 150 per the cycle count 344 and/or the time count 346. Based on the correlation 348 and the state-of-health threshold 340, the controller 200 may, as depicted at 350, in an embodiment, determine a number of cycles and/or time remaining until the state-of-health threshold 340 is reached. In other words, in an embodiment, the controller 200 may determine a rate of degradation of the energy storage device(s) 150 in terms of the cycle/time count 344, 346 and utilize the rate of degradation to project a remaining service life until maintenance of the energy storage device(s) 150 is required.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for operating a power generating asset, the power generating asset having an energy storage device operably coupled to a component of the power generating asset, the method comprising: initiating, with a controller, a state-change event for an energy storage device, the state-change event defining a plurality of sampling intervals; determining, via the controller, a change in a first electrical condition and a second electrical condition of the energy storage device at each of the plurality of sampling intervals of the state-change event; determining, via the controller, an actual equivalent series resistance (ESR) function for the energy storage device based on the change in the first and second electrical conditions at each of the plurality of sampling intervals of the state-change event; determining, via the controller, a state-of-health rating for the energy storage device based on the actual ESR function of the energy storage device; and implementing a control action based on the state-of-health rating.

Clause 2. The method of clause 1, wherein determining the state-of-health rating for the energy storage device further comprises: modeling, via the controller, a nominal ESR function for the energy storage device at an ambient temperature, wherein the nominal ESR function corresponds to a maximal state-of-health rating at the ambient temperature; modeling, via the controller, at least one potential ESR function for the energy storage device at the ambient temperature, the at least one potential ESR function indicating an increased ESR value relative to a nominal ESR value as a function of the second electrical condition, the at least one potential ESR function corresponding to a reduced state-of-health rating at the ambient temperature; and consolidating, via the controller, the nominal ESR function and the at least one potential ESR function into at least one of a look-up table, a graphical representation, and an algorithm so as to establish a correlation between the actual ESR function and the state-of-health rating for the energy storage device at the ambient temperature as a function of the second electrical condition of the energy storage device.

Clause 3. The method of any preceding clause, further comprising: defining, via the controller, a plurality of temperature intervals across a nominal operating range of temperatures for the energy storage device, wherein a temperature interval of the plurality of temperature intervals corresponds to the ambient temperature; determining, via the controller, the nominal ESR function and the at least one potential ESR function at each temperature interval of the plurality of temperature intervals; and establishing a correlation between the actual ESR function and the state-of-health rating for the energy storage device at each temperature interval as a function of the second electrical condition of the energy storage device.

Clause 4. The method of any preceding clause, wherein determining the state-of-health rating for the energy storage device further comprises determining the state-of-health rating corresponding to the determined actual ESR function at the ambient temperature of the energy storage device based on the correlation between the actual ESR function and the state-of-health rating.

Clause 5. The method of any preceding clause, wherein the first electrical condition comprises a voltage, and wherein determining a change in the first electrical condition of the energy storage device further comprises determining a difference between an open-circuit voltage of the energy storage device and an instantaneous voltage of the energy storage device at each of the plurality of sampling intervals of the state-change event.

Clause 6. The method of any preceding clause, wherein implementing the control action further comprises: detecting an approach of the state-of-health rating to a state-of-health threshold; and generating an alert to facilitate scheduling of a maintenance event.

Clause 7. The method of any preceding clause, wherein the state-change event comprises at least one of a scheduled test event and a manipulation of the energy storage device during an operation of the power generating asset.

Clause 8. The method of any preceding clause, wherein the scheduled test event is accomplished in conjunction with at least one additional component test of the power generating asset and results in an updating of the state-of-health rating.

Clause 9. The method of any preceding clause, wherein the state-change event comprises a discharging event of the energy storage device or a charging event of the energy storage device.

Clause 10. The method of any preceding clause, wherein determining the actual ESR function further comprises determining the actual ESR function as a function of the second electrical condition and independent of a first electrical condition discharge profile and a second electrical condition discharge profile.

Clause 11. The method of any preceding clause, further comprising: receiving, via the controller, at least one of a cycle count and a time count elapsed from an installation date; determining, via the controller, a correlation between the state-of-health rating and the received at least one of the cycle count and the time count, wherein the correlation is indicative of a rate of degradation of the energy to storage device per at least one of the cycle count and the time count; determining a state-of-health threshold for the energy storage device; and based on the correlation and the state-of-health threshold, determining, via the controller, at least one of a number of cycles and time until the state-of-health threshold is reached.

Clause 12. A method for operating an energy storage device, the method comprising: initiating, with a controller, a discharge event for the energy storage device, the discharge event defining a plurality of sampling intervals; determining, via the controller, a change in a voltage and a current of the energy storage device at each of the plurality of sampling intervals of the discharge event; determining, via the controller, an actual equivalent series resistance (ESR) function for the energy storage device based on the change in the voltage and the current at each of the plurality of sampling intervals of the discharge event; determining, via the controller, a state-of-health rating for the energy storage device based on the actual ESR function of the energy storage device; and implementing a control action based on the state-of-health rating.

Clause 13. The method of any preceding clause, wherein determining state-of-health rating for the energy storage device further comprises: defining, via the controller, a plurality of temperature intervals across a nominal operating range of temperatures for the energy storage device, wherein a temperature interval of the plurality of temperature intervals corresponds to the ambient temperature; modeling, via the controller, a nominal ESR function for the energy storage device at the ambient temperature, wherein the nominal ESR function corresponds to a maximal state-of-health rating at the ambient temperature; modeling, via the controller, at least one potential ESR function for the energy storage device at the ambient temperature, the at least one potential ESR function indicating an increased ESR value relative to a nominal ESR value as a function of current, the at least one potential ESR function corresponding to a reduced state-of-health rating at the ambient temperature; determining, via the controller, the nominal ESR function and the at least one potential ESR function at each temperature interval of the plurality of temperature intervals; establishing a correlation between the nominal ESR function and the at least one potential ESR function at each temperature interval as a function of the current of the energy storage device; and determining the state-of-health rating corresponding to the determined actual ESR function at the ambient temperature of the energy storage device based on the correlation between the actual ESR function and the state-of-health rating.

Clause 14. The method of any preceding clause, wherein determining the actual ESR function further comprises determining the actual ESR function as a function of current and independent of a voltage discharge profile and a current discharge profile.

Clause 15. The method of any preceding clause, wherein determining a change in the voltage of the energy storage device further comprises determining a difference between an open-circuit voltage of the energy storage device and an instantaneous voltage of the energy storage device at each of the plurality of sampling intervals of the state-change event.

Clause 16. The method of any preceding clause, wherein implementing the control action further comprises: detecting an approach of the state-of-health rating to a state-of-health threshold; and generating an alert to facilitate scheduling of a maintenance event.

Clause 17. A system for operating a power generating asset, the system comprising: an energy storage device operably coupled to a component of the power generating asset; and a controller communicatively coupled to the energy storage device, the controller comprising at least one processor configured to perform a plurality of operations, the plurality of operations comprising: initiating a state-change event for an energy storage device, the state-change event defining a plurality of sampling intervals, determining a change in a first and a second electrical condition of the energy storage device at each of the plurality of sampling intervals of the state-change event, determining an actual equivalent series resistance (ESR) function for the energy storage device based on the change in first and the second electrical conditions at each of the plurality of sampling intervals of the state-change event, determining a state-of-health rating for the energy storage device based on the actual ESR function of the energy storage device, and implementing a control action based on the state-of-health rating.

Clause 18. The system of any preceding clause, wherein determining the state-of-health rating for the energy storage device further comprises: modeling a nominal ESR function for the energy storage device at an ambient temperature, wherein the nominal ESR function corresponds to a maximal state-of-health rating at the ambient temperature; modeling at least one potential ESR function for the energy storage device at the ambient temperature, the at least one potential ESR function indicating an increased ESR value relative to a nominal ESR value as a function of second electrical condition, the at least one potential ESR function corresponding to a reduced state-of-health rating at the ambient temperature; and consolidating the nominal ESR function and the at least one potential ESR function into at least one of a look-up table, a graphical representation, and an algorithm so as to establish a correlation between the actual ESR function and state-of-health rating for the energy storage device at the ambient temperature as a function of the second electrical condition of the energy storage device.

Clause 19. The system of any preceding clause, further comprising: defining a plurality of temperature intervals across a nominal operating range of temperatures for the energy storage device, wherein a temperature interval of the plurality of temperature intervals corresponds to the ambient temperature; determining the nominal ESR function and the at least one potential ESR function at each temperature interval of the plurality of temperature intervals; and establishing a correlation between the actual ESR function and state-of-health rating for the energy storage device at each temperature interval as a function of the second electrical condition of the energy storage device.

Clause 20. The system of any preceding clause, wherein determining the state-of-health rating for the energy storage device further comprises determining the state-of-health rating corresponding to the determined actual ESR function at the ambient temperature of the energy storage device based on the correlation between the actual ESR function and the state-of-health rating.

What is claimed is:

1. A method for operating a power generating asset, the power generating asset comprising an energy storage device operably coupled to a component of the power generating asset, the method comprising:
    determining, with a controller, an open circuit voltage and an initial current of the energy storage device;
    initiating, with the controller, a state change event for the energy storage device, the state change event defining a plurality of sampling intervals;
    determining, with the controller, a change in a first electrical condition of the energy storage device by determining a difference between the open circuit voltage of the energy storage device before initiation of the state change event and an instantaneous voltage of the energy storage device at the plurality of sampling intervals of the state change event, the open circuit voltage being a top-of-charge voltage;
    determining, via the controller, a change in a second electrical condition of the energy storage device by determining a difference between the initial current of the energy storage device before initiation of the state change event and an instantaneous current of the energy storage device at each of the plurality of sampling intervals of the state change event;
    determining, via the controller, an actual equivalent series resistance (ESR) function for the energy storage device based on the changes in the first and second electrical conditions at each of the plurality of sampling intervals of the state change event;
    determining, via the controller, a state of health rating for the energy storage device based on the actual ESR function of the energy storage device; and
    implementing a control action based on the state of health rating.

2. The method of claim 1, wherein determining the state of health rating for the energy storage device further comprises:
    modeling, via the controller, a nominal ESR function for the energy storage device at an ambient temperature, wherein the nominal ESR function corresponds to a maximal state of health rating at the ambient temperature;
    modeling, via the controller, at least one potential ESR function for the energy storage device at the ambient temperature, the at least one potential ESR function indicating an increased ESR value relative to a nominal ESR value as a function of the second electrical condition, the at least one potential ESR function corresponding to a reduced state of health rating at the ambient temperature; and
    consolidating, via the controller, the nominal ESR function and the at least one potential ESR function into at least one of a look up table, a graphical representation, and an algorithm so as to establish a correlation between the actual ESR function and the state of health rating for the energy storage device at the ambient temperature as a function of the second electrical condition of the energy storage device.

3. The method of claim 2, further comprising:
    defining, via the controller, a plurality of temperature intervals across a nominal operating range of temperatures for the energy storage device, wherein a temperature interval of the plurality of temperature intervals corresponds to the ambient temperature;
    determining, via the controller, the nominal ESR function and the at least one potential ESR function at each temperature interval of the plurality of temperature intervals; and
    establishing a correlation between the actual ESR function and the state of health rating for the energy storage device at each temperature interval as a function of the second electrical condition of the energy storage device.

4. The method of claim 3, wherein determining the state of health rating for the energy storage device further comprises determining the state of health rating corresponding to the determined actual ESR function at the ambient temperature of the energy storage device based on the correlation between the actual ESR function and the state of health rating.

5. The method of claim 1, wherein implementing the control action further comprises:
  detecting an approach of the state of health rating to a state of health threshold; and
  generating an alert to facilitate scheduling of a maintenance event.

6. The method of claim 1, wherein the state change event comprises at least one of a scheduled test event and a manipulation of the energy storage device during an operation of the power generating asset.

7. The method of claim 6, wherein the scheduled test event is accomplished in conjunction with at least one additional component test of the power generating asset and results in an updating of the state of health rating.

8. The method of claim 1, wherein the state change event comprises a discharging event of the energy storage device or a charging event of the energy storage device.

9. The method of claim 1, wherein determining the actual ESR function further comprises determining the actual ESR function as a function of the second electrical condition and independent of a first electrical condition discharge profile and a second electrical condition discharge profile.

10. The method of claim 1, further comprising:
  receiving, via the controller, at least one of a cycle count and a time count elapsed from an installation date;
  determining, via the controller, a correlation between the state of health rating and the received at least one of the cycle count and the time count, wherein the correlation is indicative of a rate of degradation of the energy storage device per at least one of the cycle count and the time count;
  determining a state of health threshold for the energy storage device; and
  based on the correlation and the state of health threshold, determining, via the controller, at least one of a number of cycles and time until the state of health threshold is reached.

11. A system for operating a power generating asset, the system comprising:
  an energy storage device operably coupled to a component of the power generating asset; and
  a controller communicatively coupled to the energy storage device, the controller comprising at least one processor configured to perform a plurality of operations, the plurality of operations comprising:
    determining an open circuit voltage and an initial current of the energy storage device;
    initiating a state change event for an energy storage device, the state change event defining a plurality of sampling intervals;
    determining a change in a first electrical condition of the energy storage device by determining a difference between the open circuit voltage of the energy storage device before initiation of the state change event and an instantaneous voltage of the energy storage device at the plurality of sampling intervals of the state change event, the open circuit voltage being a top-of-charge voltage;
    determining a change in a second electrical condition of the energy storage device by determining a difference between the initial current of the energy storage device before initiation of the state change event and an instantaneous current of the energy storage device at each of the plurality of sampling intervals of the state change event;
    determining an actual equivalent series resistance (ESR) function for the energy storage device based on the changes in the first and the second electrical conditions at each of the plurality of sampling intervals of the state change event;
    determining a state of health rating for the energy storage device based on the actual ESR function of the energy storage device; and
    implementing a control action based on the state of health rating.

12. The system of claim 11, wherein determining the state of health rating for the energy storage device further comprises:
  modeling a nominal ESR function for the energy storage device at an ambient temperature, wherein the nominal ESR function corresponds to a maximal state of health rating at the ambient temperature;
  modeling at least one potential ESR function for the energy storage device at the ambient temperature, the at least one potential ESR function indicating an increased ESR value relative to a nominal ESR value as a function of second electrical condition, the at least one potential ESR function corresponding to a reduced state of health rating at the ambient temperature; and
  consolidating the nominal ESR function and the at least one potential ESR function into at least one of a look up table, a graphical representation, and an algorithm so as to establish a correlation between the actual ESR function and state of health rating for the energy storage device at the ambient temperature as a function of the second electrical condition of the energy storage device.

13. The system of claim 12, where the plurality of operations further comprise:
  defining a plurality of temperature intervals across a nominal operating range of temperatures for the energy storage device, wherein a temperature interval of the plurality of temperature intervals corresponds to the ambient temperature;
  determining the nominal ESR function and the at least one potential ESR function at each temperature interval of the plurality of temperature intervals; and
  establishing a correlation between the actual ESR function and state of health rating for the energy storage device at each temperature interval as a function of the second electrical condition of the energy storage device.

14. The system of claim 13, wherein determining the state of health rating for the energy storage device further comprises determining the state of health rating corresponding to the determined actual ESR function at the ambient temperature of the energy storage device based on the correlation between the actual ESR function and the state of health rating.

* * * * *